(12) United States Patent
Straight (10) Patent No.: US 10,638,868 B1
(45) Date of Patent: May 5, 2020

(54) COOKER ASSEMBLY FOR PLEASURE BOATS AND OTHER VESSELS

(71) Applicant: Brent S. Straight, Anacortes, WA (US)

(72) Inventor: Brent S. Straight, Anacortes, WA (US)

(*) Notice: Subject to any disclaimer, the term of this patent is extended or adjusted under 35 U.S.C. 154(b) by 536 days.

(21) Appl. No.: 15/530,594

(22) Filed: Feb. 3, 2017

Related U.S. Application Data

(60) Provisional application No. 62/388,813, filed on Feb. 5, 2016.

(51) Int. Cl.
| | |
|---|---|
| *A47J 27/00* | (2006.01) |
| *A47J 36/20* | (2006.01) |
| *A47J 36/34* | (2006.01) |
| *A47J 27/04* | (2006.01) |

(52) U.S. Cl.
CPC .......... *A47J 27/002* (2013.01); *A47J 27/004* (2013.01); *A47J 36/20* (2013.01); *A47J 36/34* (2013.01); *A47J 2027/043* (2013.01)

(58) Field of Classification Search
CPC ................ A47J 37/0704; A47J 37/0754; A47J 37/0763; A47J 37/079; A47J 36/06; A47J 36/12; A47J 37/1271; A47J 37/108; A47J 47/16; A47J 37/0713; B63B 29/12; B63B 17/00; F24C 15/36; F24C 3/027; F24C 3/14; B60R 11/00; B60R 2011/004; B60R 9/06; B60R 2011/0036
USPC ......... 99/328, 339, 356, 340, 445, 448, 449, 99/451; 126/24, 25 R, 276, 25 A, 56, 126/9 R, 19 M, 29, 30, 39 R, 390.1, 41 R, 126/50; 219/391, 392, 521, 385, 386, 219/389, 85.17
See application file for complete search history.

(56) References Cited

U.S. PATENT DOCUMENTS

| | | | | |
|---|---|---|---|---|
| 1,764,039 A | * | 6/1930 | Cooper ................... | A47J 36/22 220/4.22 |
| 2,520,412 A | * | 8/1950 | Jensen ................... | B63B 29/12 126/24 |
| 2,693,176 A | * | 11/1954 | Spiers .................... | F24C 3/027 114/191 |
| 3,316,389 A | * | 4/1967 | Markowitz ......... | A47J 37/0623 219/393 |
| 4,445,495 A | | 5/1984 | Frost | |
| 5,076,193 A | | 12/1991 | Keim | |
| 6,257,125 B1 | | 7/2001 | Pate | |

(Continued)

FOREIGN PATENT DOCUMENTS

| | | |
|---|---|---|
| EP | 0197565 | 10/1986 |
| EP | 0866937 | 2/2003 |

*Primary Examiner* — Serkan Akar
*Assistant Examiner* — Chris Q Liu (57) ABSTRACT

An assembly for cooking onboard a boat or other vessel, having a pot that is suspended outboard of the vessel to reduce hazards and inconveniences while boiling or steaming food such as shellfish or vegetables. A burner or electric heat source is mounted at the bottom of the kettle, and the upper end of the pot is mounted to a gimble assembly so that the pot and heat source remain upright as the vessel pitches and rolls. A support assembly holds the gimble assembly away from the side of the vessel so as to suspend the pot over the surrounding water and away from the deck and the cabin and other enclosed areas. The inboard end of the support may be releasably mountable to a rod holder previously installed on a gunwale of the vessel.

13 Claims, 8 Drawing Sheets

(56) References Cited

U.S. PATENT DOCUMENTS 7,188,617 B1     3/2007   O'Blenes
2014/0175139 A1*   6/2014   Pereira .................. B60N 3/103
                                                                                                224/545

* cited by examiner

COOKER ASSEMBLY FOR PLEASURE BOATS AND OTHER VESSELS

RELATED CASES

This application claims the benefit of U.S. Provisional Patent Application Ser. No. 62/388,813 filed on Feb. 5, 2016.

BACKGROUND a. Field of the Invention

The present invention relates generally to an apparatus for cooking food onboard boats and other vessels, and, more particularly, to a cooker for boiling and/or steaming seafood and other food items that operates in a position suspended outboard a side of a vessel.

b. Related Art

Cooking and dining onboard can be one of the greatest pleasures of boating. Many recreational boats are equipped with galley facilities of one kind or another, but typically in the form of a small cramped "kitchenette" located somewhere inside the main cabin that also includes the berthing/living areas of the boat. Other boats, usually in the smaller sizes, lack any galley facilities whatever yet the owners would still like to be able to cook while afloat. As a result, boaters often wish to cook outdoors, whether for reasons of pleasure or lack of interior space or facilities, or to avoid releasing the smoke, steam and/or odors of cooling into the cabin of the vessel.

However, despite the attractions, cooking onboard a boat or other vessel involves certain hazards. Perhaps the most serious is the risk of fire, a danger that has been notorious amongst seafarers since time immemorial. The risk of fire is heightened onboard not only by the presence of fuel or other flammable, but also by the constant and unpredictable rolling and pitching of the vessel whenever afloat. These motions increase not only accidental fire, but also for persons to be burnt by hot surfaces or scalded by spilled liquids. Spillage may also create problems with persons slipping on wet deck surfaces while pitching or rolling, as well as simply rendering it difficult to keep the deck and/or interior spaces of the craft clean.

Given the obvious concerns of smoke and an open flame, numerous efforts have been made at providing outside grills (barbeques) for boats and other small craft. In most instances these have taken the form of a more-or-less conventional propane (LPG) grill mounted somewhere about the cockpit area, on a preexisting handrail for example. While such devices have enjoyed a significant degree of success, they are by nature only satisfactory for grilling foods such as steaks, fish, chicken, hamburgers, hotdogs, and kebabs, and as such are generally unsuitable for other forms of cooking. For example, crabs, clams, oysters and other shellfish, which are popular catches, are typically cooked by steaming or boiling in large pots, a task for which outdoor grills are wholly unsuited. However, attempting to boil and/or steam shellfish on a stovetop in a kitchenette or other enclosed galley presents very serious hazards of the types noted above, including burning, scalding and spillage, as well as inevitably introducing copious amounts of steam to the interior of the vessel. Other foods that commonly require boiling include various vegetables such as potatoes and corn, the latter being an especially popular side to cooked shellfish.

Accordingly, there exists a need for an onboard apparatus that provides for safe and pleasurable cooking on deck or otherwise outside the interior of a pleasure boat or other vessel, and particularly for boiling and/or steaming shellfish or other foods. Furthermore, there exists a need for such an apparatus that reduces the risk of fire and spillage aboard such a boat or vessel, and also reduces the potential for burning and/or scalding the persons involved. Still further, there exists a need for such an apparatus that is convenient and easy to use so as to facilitate a pleasant and safe cooking experience for the operator.

SUMMARY OF THE INVENTION

The present invention addresses the problems cited above, and provides an apparatus for boiling and/or steaming food onboard a boat or other vessel, in which the container of the cooking apparatus is suspended outboard a side of the boat so that the heated surfaces and any flame thereof are positioned away from the interior of the vessel, along with the steam that is produced during cooking and any spillage that might result from motion of the vessel.

In a broad aspect, the apparatus comprises (a) a heat source; (b) a pot member that holds a volume of water and that is mounted atop the heat source; (c) a support member that is mountable to a gunwale of the boat or other vessel; and (d) a gimbal that supports the pot and heat source on the support member in a position outboard a side of the gunwale and maintains the pot and heat source substantially upright as the vessel undergoes rolling and pitching while afloat.

The heat source may comprise a heat source that is integrally mounted to a base of the pot member. The pot member may comprise a perforated strainer that contains the shellfish or other food to be cooked. The heat source may comprise a burner supplied with propane, diesel, white gas or other combustible fuel, or may comprise an electric resistance heating element or induction heating element.

The support member may comprise an upright support that is mountable to the gunwale of the boat or other vessel. The gimbal may comprise a gimbal member mounted to the upright support member that extends outwardly therefrom so as to suspend the pot member a spaced distance outboard of the gunwale. The upright support may be mountable to a preexisting mounting feature on the gunwale. The preexisting mounting feature may comprise a rod holder.

These and other features and advantages of the invention will be more fully appreciated from a reading of the following detailed description with reference to the accompanying drawings.

DETAILED DESCRIPTION

Figure 1:
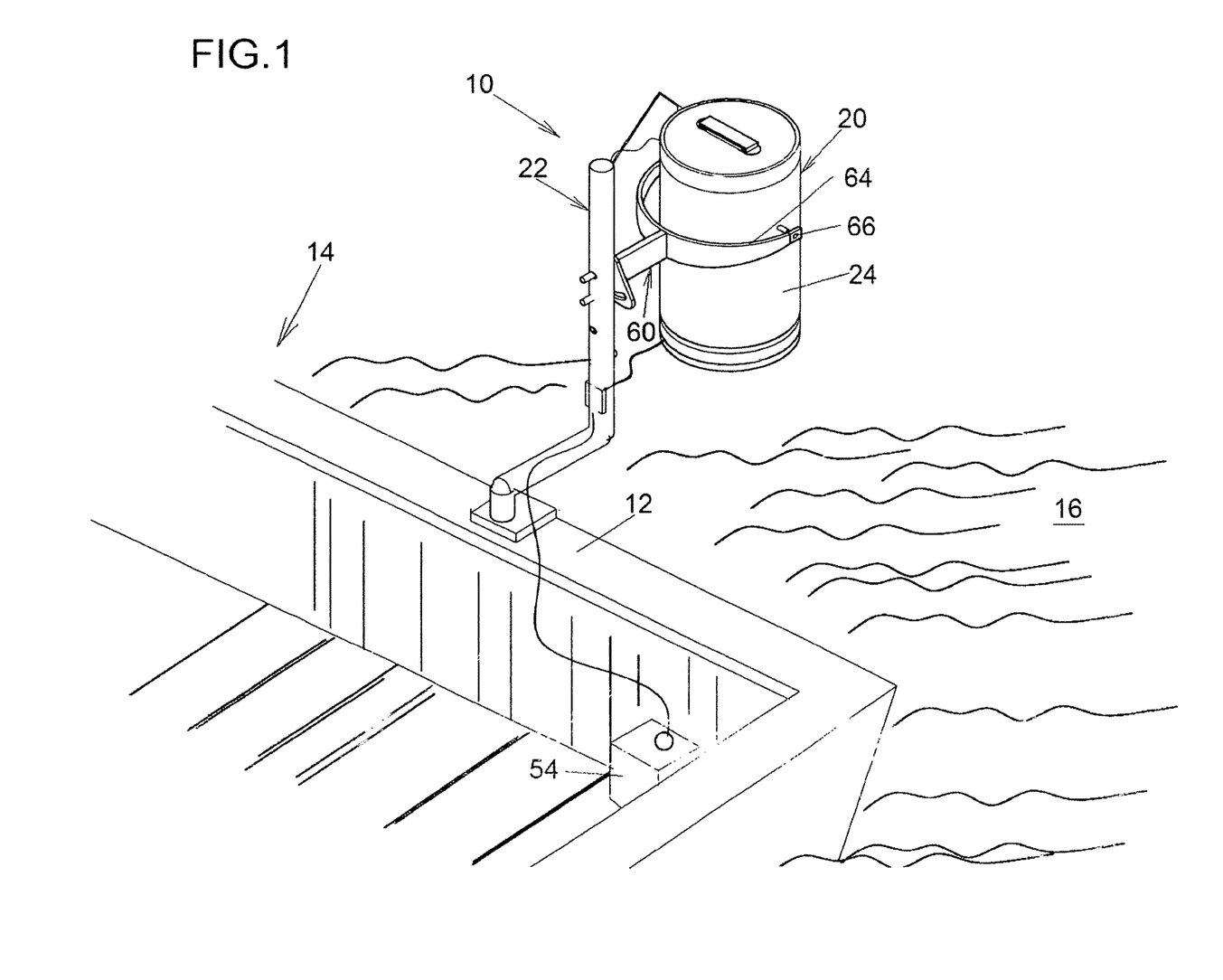
FIG. 1 is a perspective view of a cooker assembly in accordance with the present invention, mounted outboard the gunwale of an exemplary pleasure boat or other vessel.

FIG. 1 shows a cooker assembly 10 in accordance with the present invention, mounted to the gunwale 12 of an exemplary pleasure boat 14 or similar vessel so as to be suspended outboard of the vessel and over the surrounding water 16. As can also be seen with reference to FIGS. 2-3, the cooker assembly 10 includes two principle subassemblies, namely, a steamer/boiler assembly 20 in which the food is cooked and a support arm assembly 22 that suspends the steamer/boiler assembly outboard from the vessel.

Figure 2:
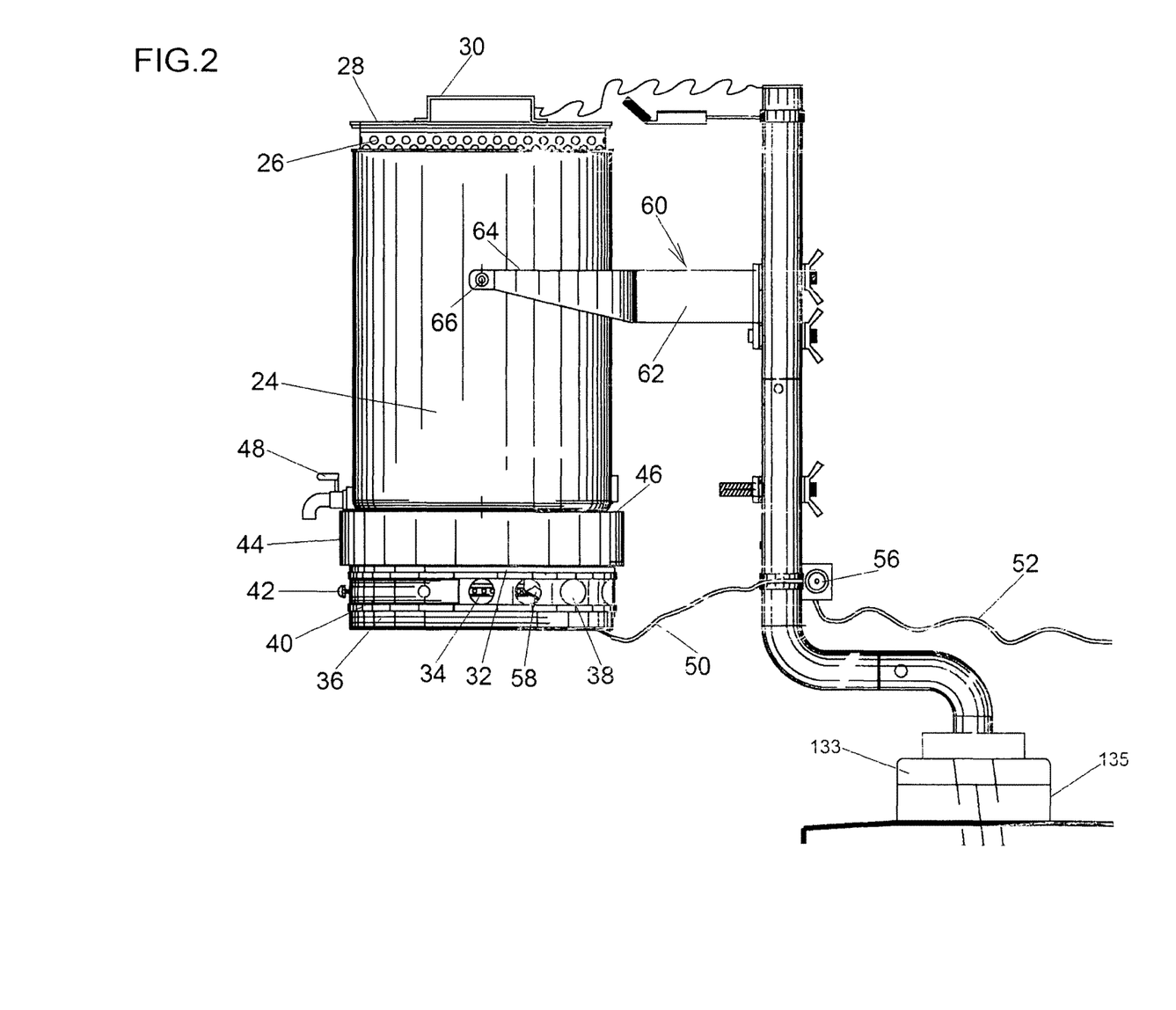
FIG. 2 is a side elevational view of the cooker assembly of FIG. 1.
Figure 3:
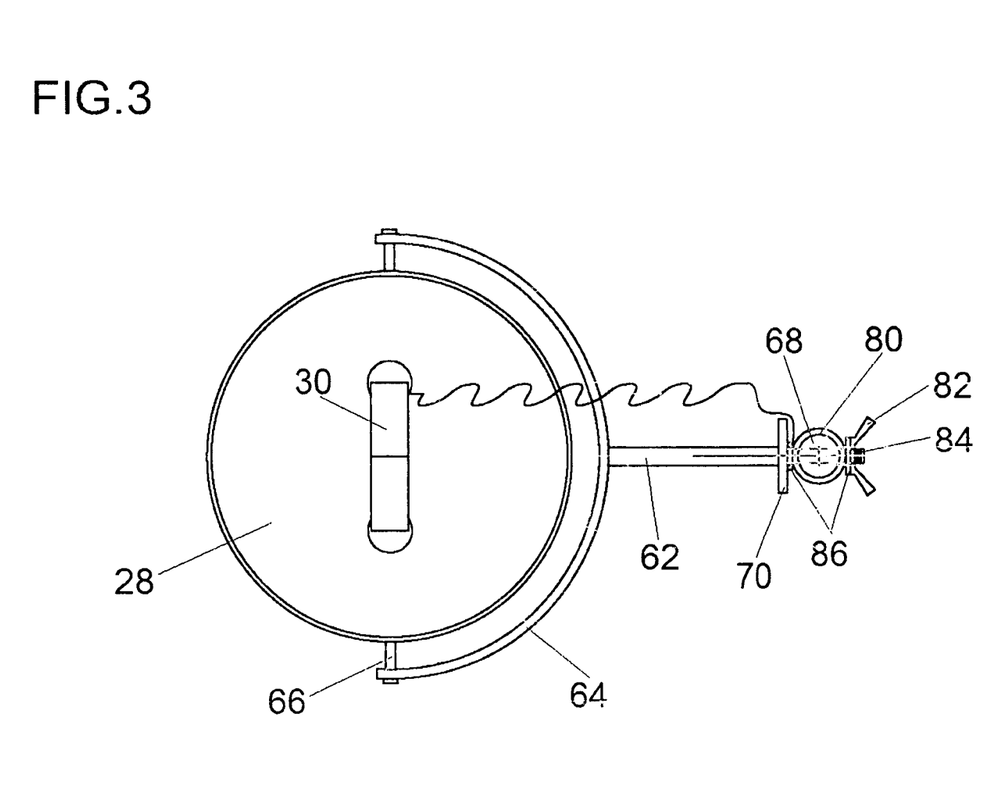
FIG. 3 is a top plan view of the cooker assembly of FIGS. 1-2.
Figure 4:
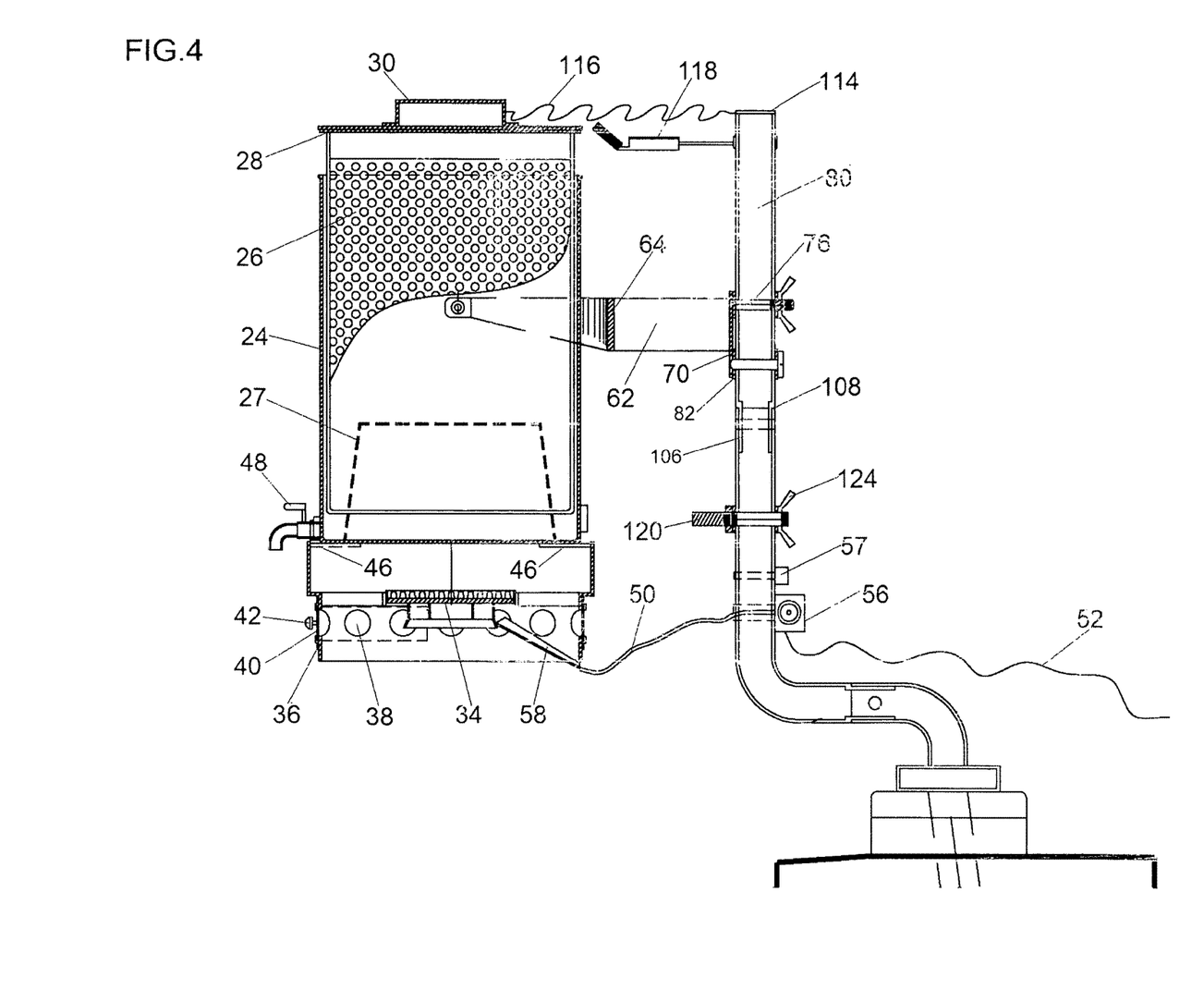
FIG. 4 is an elevational, cross-sectional view of the cooker assembly of FIG. 2.

As can be seen more clearly in FIGS. 2-4, the steamer/boiler assembly 20 includes a pot member 24 that holds a removable strainer basket 26 and that is closed by a lid 28 having a handle 30. A steam rack 27 may also be included, that rests on the bottom of the main pot 24 as shown in FIG. 4, to support the strainer basket above the level of the water in the pot. With just these basic components, the pot member somewhat resembles a conventional cooker pot with a strainer insert, and may suitably be constructed of aluminum, stainless steel or other suitable durable, heat resistant material. In the present invention, however, the closed lower end portion of the pot member 24 is integrally combined with a burner section 32 that provides a heat source for boiling water in the pot member and cooking the contents. The burner section includes a heating element 34 that in the illustrated embodiment is a propane-fueled burner, but in other embodiments may be burners using other forms of fuel such as white gas or diesel, or electric heating elements such as resistance heating coils or induction heating elements, for example.

As can be seen with further reference to FIGS. 2-4, burner 34 is enclosed within a depending shell 36, suitably cylindrical in shape that includes a series of vent openings 38 that admit combustion air, and a wind guard 40 that is slidable in an annular track using a knob 42 so as to selectively block or open the vent openings depending on wind direction and force. The burner section is welded or otherwise connected to the bottom of the steamer/boiler pot at a burner seat 44, so that the burner section and pot are joined together as an integrated structure, with a vent space 46 being provided at the top of the burner seat to allow combustion gasses to escape outwardly and upwardly about the perimeter of the pot.

A drain cock 48 is also mounted at the base of pot 24, to allow water/liquid to be drained and rinsed out when desired. The drain cock is preferably located towards the outboard side of the pot, so that when the pot is suspended over the side as shown in FIG. 1 the drain cock will discharge directly into the water and well away from the side of the boat.

Propane (LP gas) or other combustible fuel is supplied to the burner section through a flexible fuel line 50, from a main supply line 52 that is connected to a tank 54 (see FIG. 1) or other onboard source and routed through a regulator 56. The end of fuel line 50 that is in turn connected to the burner is shielded from heat/flame by a metal plate 58. In addition, an electric igniter 59 may optionally be included. In the case of embodiments using electric heating elements rather than gas, an electrical cord may be employed to supply current from a suitable source, such as an onboard generator or an inverter operating on batteries, for example.

As can be seen, the entire steamer/boiler assembly 20, including the burner section is supported from the arm assembly 22 by a gimbal mechanism 60. The gimbal mechanism includes a generally horizontal pivotable cantilever arm 62 having a forked, semicircular support yoke 64 at its cantilevered outer end that extends around the upper end of pot 24. End portions of the support yoke are joined to opposite sides of the pot by coaxial pivot connections 66, aligned 180° to the axis of the pivot arm and generally parallel to the gunwale of the boat (when the assembly is mounted and swung out as seen in FIGS. 1-4). As can be seen with further reference to FIGS. 2 and 4, pivot connections 66 are preferably located relatively close to the top of the steamer/boiler pot (i.e., above midlevel) so that the majority of the combined weight of the pot, whether empty or filled, and the burner section, will be located below the pivot connections and therefore act as ballast to maintain the assembly stable and upright within gimbal mechanism 60.

Figure 5:
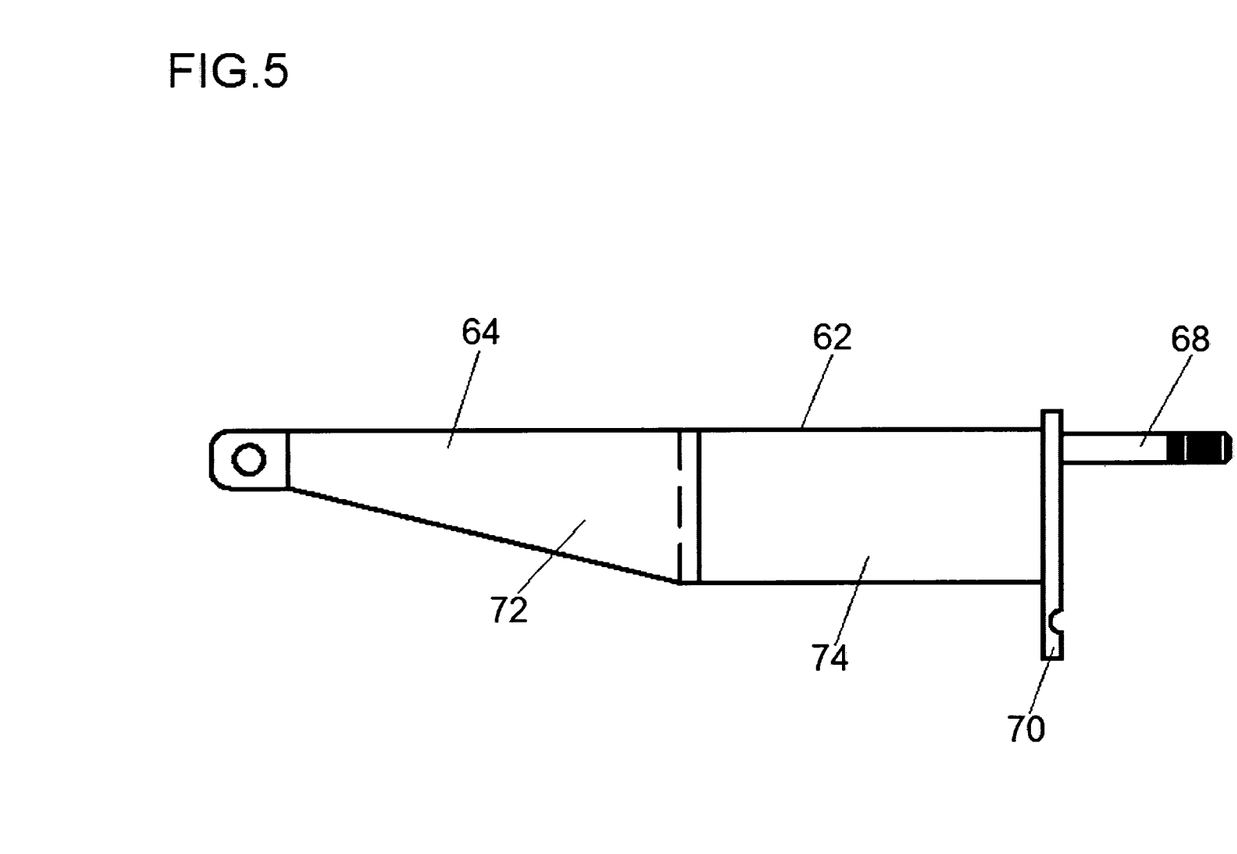
FIG. 5 is a side elevational view of the gimbal arm of the cooker assembly of FIGS. 1-3.
Figure 6:
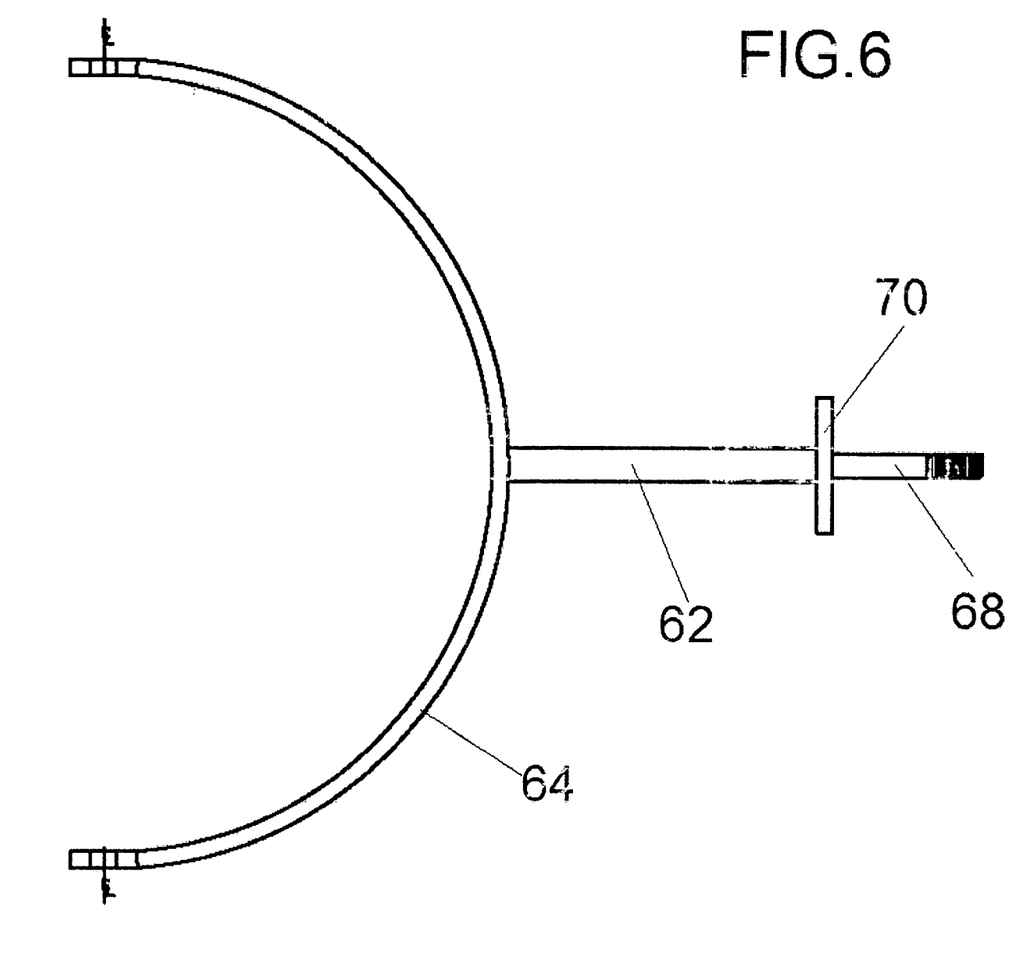
FIG. 6 is a top plan view of the gimbal arm of FIG. 5.

As can be seen in FIG. 3 and also FIGS. 5-6, the base end of cantilever arm 62 includes an axial shaft 68 that extends in a direction generally opposite pot support bracket 64. As will be described in greater detail below, shaft 68 connects to support assembly 22 in a manner that provides a second axial pivot axis, that is aligned with a lengthwise longitudinal axis of the cantilever arm and perpendicular to the transverse pivot axis that is formed between yoke 64 and pot 24 by pivot connections 66. A slotted plate 70 extends downwardly from the junction between arm 62 and shaft 68, generally perpendicular to the axis of the latter. As shown in FIG. 4, the lower extent of the yoke bracket is preferably formed as an outwardly tapering flange 72, that is joined to the lower portion of pivot plate 70 by lower flange 74 of arm 62, to help support and transfer the weight of the cooker assembly into the support assembly 22.

Referring again to FIGS. 3 and 4, the base shaft 68 of cantilever arm 62 is inserted through a cooperating horizontal bore 76, formed in an upright stanchion 80 of the support assembly 22. A wing nut 82 is installed on the threaded end 84 of shaft 68 to join the arm 62 to the stanchion in pivoting relationship. Low friction washers 86, suitably formed of Teflon, nylon, UHMWPE or a similar plastic material, are installed on the shaft to form bearing interfaces between the stanchion and the nut on one side and the pivot plate 70 on the other. The arm and the pot assemblies are thus able to pivot about the horizontal longitudinal axis defined by pivot shaft 68, in a fore-and-aft direction relative to the vessel as shown in FIG. 1, with selective tightening of the wing nut serving to dampen the motion as designed; the second horizontal transverse axis formed by pivot connections 66 in turn enables the pot assembly to swing in-and-out in an athwart-ships direction.

Consequently, the pot assembly, ballasted as described above, maintains a more-or-less upright orientation to avoid spillage despite pitching and rolling of the boat or other vessel. The extent of pivoting in-and-out swing in motion, in a direction perpendicular to the gunwale in FIG. 1 may be limited to a designed maximum by contact between the steamer/boiler pot and the gimbal yoke. Pivoting motion in a fore-and-aft direction, parallel to the gunwale, may in turn be limited by cooperation of an arcuate slot 88 in a lower part of pivot plate 70 and a stop pin 90 that is installed in stanchion 80 below and parallel to pivot shaft 68. As can be seen in FIG. 6B, the stop pin 90 is sized to be received in the arcuate channel of the pivot shaft, the channel including first and second end points 92a, 92b, such that the pivot arm and plate will thus pivot freely in each direction until the ends 92a, 92b of the channel coming up against the stationary limit pin 90. As can be seen in FIGS. 2 and 6A, the limit pin 90 is secured in the upright stanchion 84 of the support assembly, by a nut 94 that is installed on a threaded end 96 of the pin opposite that which is received in the channel 78 of the pivot plate. The permitted range of motion may vary depending on design factors, but in the illustrated embodiment may suitably be about 30° total, i.e., 15° fore-and-aft of vertical. A low-friction washer 98 is installed between plate 70 and the side of the stanchion to facilitate the pivoting movement of the former.

Figure 7A:
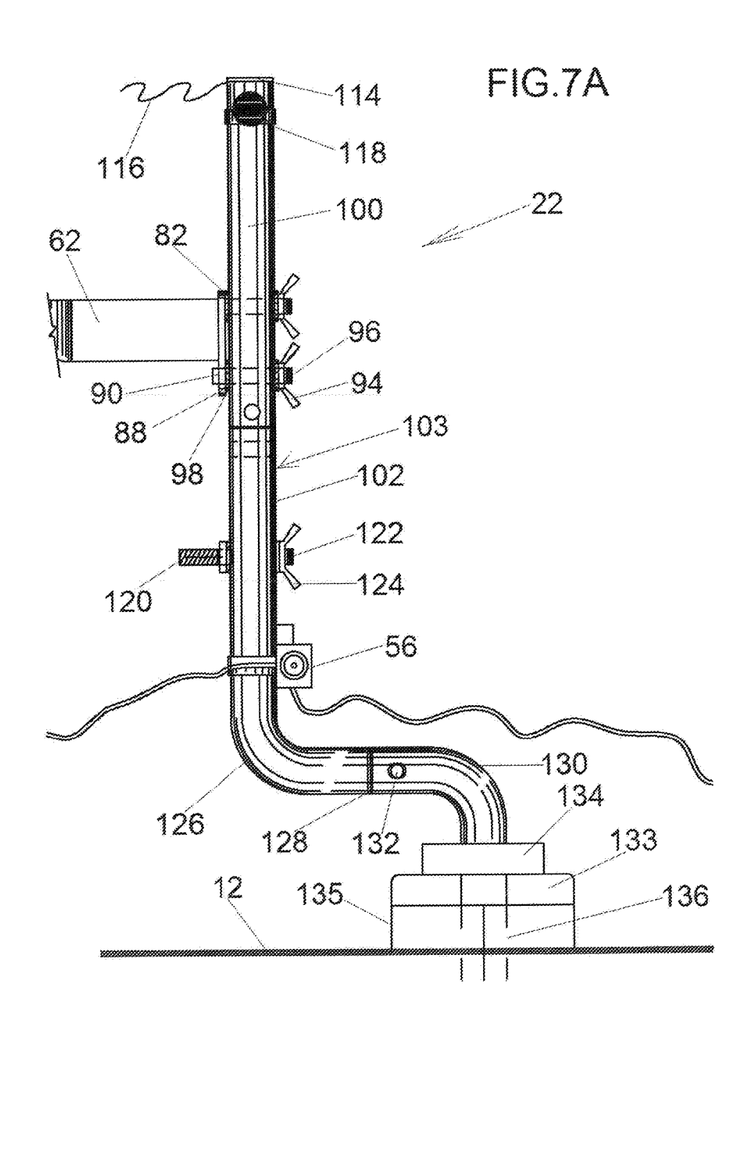
FIGS. 7A-7B are, respectively, side and front elevational views of the support arm of the cooker assembly of FIGS. 1-3.
Figure 7B:
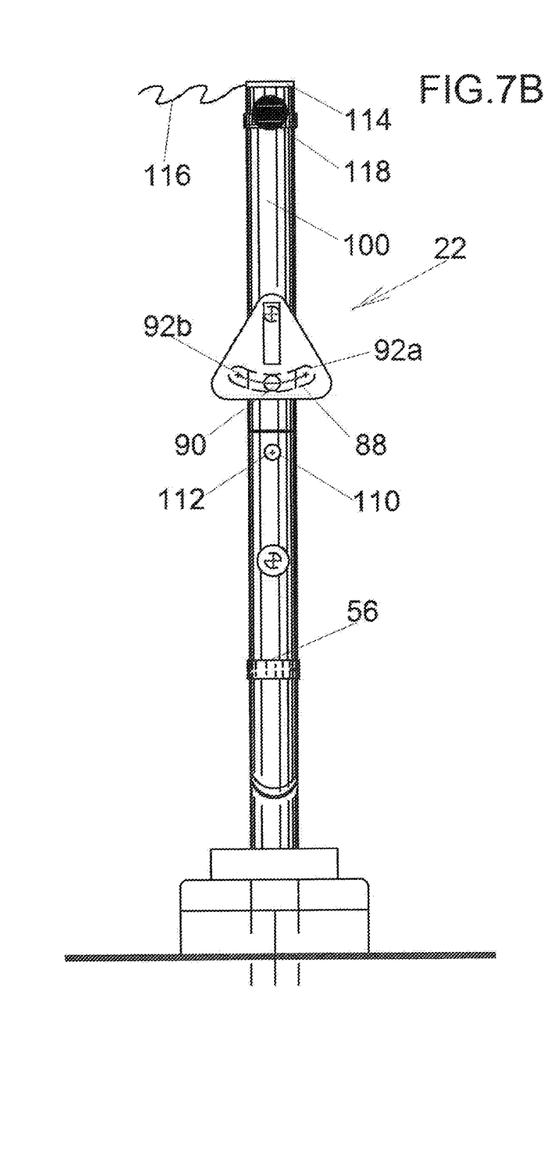
Figure 8A:
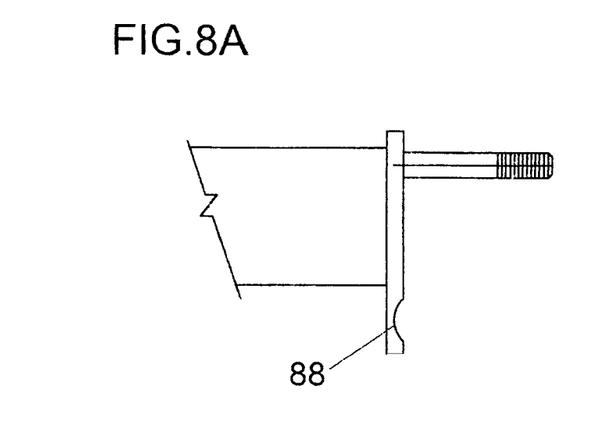
FIGS. 8A-8C are, respectively, side, front and rear elevational views of the slotted pivot plate of the gimbal arm of FIGS. 5-6, that joins the gimbal arm to the support arm in pivoting relationship therewith.
Figure 8B:
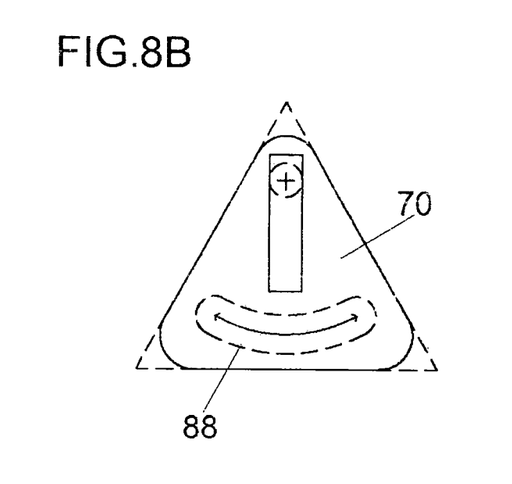
Figure 8C:
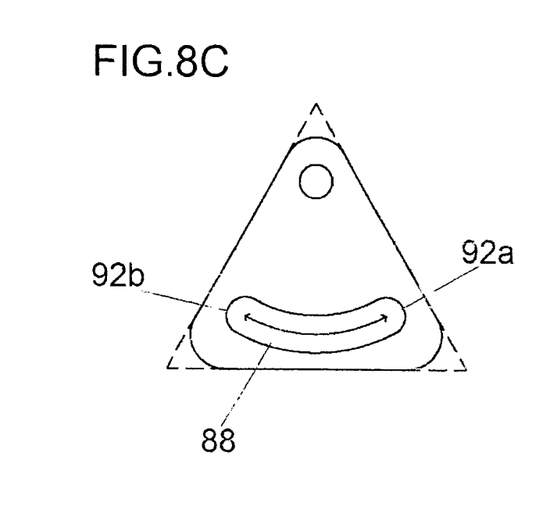

As can be seen with further reference to FIGS. 4 and 7A-7B, the pivot arm of the support assembly is suitably constructed of a series of rigid tubular members mounted in end-to-end relationship, suitably formed of aluminum, stainless steel, fiberglass or molded plastic pipe, for example. Upper and lower relatively elongate, straight members 100, 102 form a vertical stanchion portion 103 of the support arm, with the arm 62 of the gimbal mechanism being mounted to the upper member in the manner described above. The lower end of the upper tubular member 100 is necked down to form a reduced-diameter neck portion 106 (see FIG. 4), that in turn is received in the upper end of the lower tubular member 102 to form a vertical-axis sleeve-and-socket connection 108 that permits the upper member 100 to rotate relative to the lower member 102. A spring-loaded locking button 110 projects from the stepped-down neck of the upper tubular member, through a cooperating opening 112 in the lower member 102 so as to lock the members against relative rotation. Depressing button 110 releases the locking mechanism, thereby allowing the gimbal mechanism and pot assembly to be pivoted inboard for access at the gunwale, e.g., to load/unload basket 26. Depressing button 110 also allows the upper member 100 to be withdrawn from the lower member, for disassembly and stowage when desired.

A cap 114 closes the top of the upper tubular member 100, and a lanyard connects the lid 30 of the pot assembly to the upper end of the stanchion to the lid 30 of the pot assembly to prevent losing the lid overboard. In addition, a lamp unit 118 (e.g., an LED light unit) may be mounted to the upper end of the stanchion for purposes of illuminating the lid and the contents of the pot during dark.

A spring stopper 120 is mounted in the lower stanchion member 102 so as to extend outwardly towards the pot assembly, on a shaft 122 that is secured in the member by a nut 124 shaft. The bottom of the lower stanchion member is in turn mounted to a first 90° elbow 126 that bends downwardly and inwardly to a horizontal leg that extends towards the gunwale of the boat, and that is mounted at a sleeve-and-socket joint 128 to a second 90° elbow 130, joint 128 being secured by a spring-loaded button catch 132 similar to that described above. The second 90° elbow 130 extends horizontally and then back down vertically, the vertical leg being mounted to a base 134 that is in turn rotatably supported on a mounting plate 133. The mounting plate may be mounted directly to the gunwale, or, as is shown in FIGS. 6A-6B and also FIG. 2, it may be mounted to an adaptor 135 having a bore 136 that fits over and detachably engages a downrigger-type fishing rod holder, sometimes referred to colloquially as a "rocket launcher," of a generally conventional type that is commonly fitted to recreational boats; as can be seen, the bore 136 may be angled off vertical (e.g., by 5-30°) so as to correspond to the angle of the rod holder over which it fits.

The support assembly 22 may therefore be assembled and disassembled by joining/disconnecting the tubular segments and other components described above. The pieces of the support assembly are preferably sized so that when disassembled they will all fit within the interior of the strainer basket 26, which is in turn housed within the outer pot 24, thus providing compact, space efficient storage of the apparatus. Moreover, the entire pot assembly, with the components of the support assembly stowed therein, may be sized to fit within a standard 5 gallon bucket having a snap lid, both for purposes of shipping and marketing and also to provide the boat owner with a container that not only stores the system but that is also useful as an implement in and of itself.

It will be understood that the scope of the appended claims should not be limited by particular embodiments set forth herein, but should be construed in a manner consistent with the specification as a whole.

What is claimed is:

1. A cooking apparatus for boiling or steaming food onboard a boat or other vessel having sides and an interior, said apparatus comprising:
   an upright arm assembly that is configured to be mounted to an edge of said boat;
   a pot assembly that is configured to hold said food and water; and
   a gimbal mechanism that supports said pot assembly on said upright arm assembly, said gimbal mechanism comprising:
      a cantilever arm that extends horizontally from said upright arm assembly, said cantilever arm having a base end, an outer end and a longitudinal axis;
      an axial pivot connection that is configured to permit said pot assembly to pivot about an axis parallel to said longitudinal axis of said cantilever arm;
      a transverse pivot connection that is configured to permit said pot assembly to pivot about an axis transverse to said longitudinal axis of said cantilever arm; wherein said transverse pivot connection of said gimbal mechanism comprises: at least one transverse pivot connection that joins said outer end of said cantilever arm and a side of said pot assembly;
      a support bracket mounted to said outer end of said cantilever arm that extends on opposite sides of said pot assembly; and first and second pivot connections formed between said support bracket and said opposite sides of said pot assembly in coaxial alignment along said transverse pivot axis; and
      a pivot plate mounted to said base end of said cantilever arm that extends perpendicular to said longitudinal axis of said cantilever arm, said pivot plate comprising:
         an opening defining first and second ends of an arcuate path about an axis perpendicular to said pivot plate; and
         a stop pin mounted to said upright arm assembly that extends through said opening in said pivot plate along a stationary axis, so that said stop pin reacts with said pivot plate at said first and second ends of said arcuate path to limit pivoting motion of said gimbal assembly relative to said upright arm assembly;
      said gimbal mechanism being dimensioned to space said pot assembly horizontally from said upright arm assembly a distance sufficient to position said pot assembly over water surrounding said boat or other vessel and away from said interior thereof.

2. The cooking apparatus of claim 1, wherein said support bracket comprises: a support yoke, said support yoke comprising: a base portion that is mounted to said outboard end of said cantilever arm; and first and second arm portions that extend horizontally from said base portion on said opposite sides of said pot assembly.

3. The cooking apparatus of claim 1, wherein, said pot assembly comprises: a cooking pot having said first and second pivot connections to said support bracket mounted directly to opposite sides thereof, so that said cooking pot is directly attached to said support bracket of said gimbal mechanism.

4. The cooking apparatus of claim 3, wherein said pot assembly further comprises:
 a heat source that is integrally mounted to a bottom of said cooking pot, so that the weight of said heat source cooperates with said first and second pivot connections to maintain said pot assembly level and upright.

5. The cooking apparatus of claim 4, wherein said heat source is a fuel-fired burner.

6. The cooking apparatus of claim 5, wherein said heat source is an electric burner.

7. The cooking apparatus of claim 5, wherein said pot assembly further comprises:
 a spigot mounted to a bottom portion of said cooking pot, that permits said cooking pot to be drained while remaining attached to said support bracket and being positioned by said gimbal mechanism away from said interior of said boat or other vessel.

8. The cooking apparatus of claim 1, wherein said axial pivot connection comprises: at least one axial pivot connection that joins said base end of said cantilever arm to said upright arm assembly.

9. The cooking apparatus of claim 8, wherein said at least one axial pivot connection comprises:
 a pivot pin mounted to said base end of said cantilever arm that extends through a cooperating bore in said upright arm assembly in pivoting relationship therewith.

10. The cooking apparatus of claim 8, wherein said upright arm assembly comprises:
 an upright member that extends in a vertical direction and to which said gimbal mechanism is mounted;
 a base member that is configured to be mounted to an edge of said boat or other vessel; and
 a lateral member that connects said base member to said upright member and extends in a horizontal direction so as to offset said upright member outboard from said interior of said boat or other vessel.

11. The cooking apparatus of claim 10, wherein said upright member of said upright arm assembly comprises:
 a lower segment that is mounted to said lateral member of said upright arm assembly; and
 an upper segment that is pivotably mounted to said lower segment for rotation about a vertical axis, said upper segment having said gimbal mechanism mounted thereon, so that said pot assembly on said gimbal mechanism is pivotable about said vertical axis through an arc towards and away from said interior of said boat or other vessel.

12. The cooking apparatus of claim 11, wherein said upright member further comprises:
 a locking mechanism that releasably secures said upper segment to said lower segment in a position with said pot assembly on said gimbal mechanism pivoted to a position away from said interior of said boat or other vessel.

13. The cooking apparatus of claim 11, wherein said lower end of upper segments of said upright member are constructed of tubular material, and wherein said upright member further comprises:
 a sleeve-and-socket pivot connection formed between said upper segment and said lower segment that permits said upper segment to rotate about said vertical axis relative to said lower segment.

* * * * *